(12) United States Patent  
Chaudhury et al.

(10) Patent No.: US 9,064,309 B2  
(45) Date of Patent: Jun. 23, 2015

(54) AUTOMATIC RECTIFICATION OF DISTORTIONS IN IMAGES

(71) Applicant: Google Inc., Mountain View, CA (US)

(72) Inventors: Krishnendu Chaudhury, Saratoga, CA (US); Stephen J. DiVerdi, Oakland, CA (US)

(73) Assignee: Google Inc., Mountain View, CA (US)

( * ) Notice: Subject to any disclaimer, the term of this patent is extended or adjusted under 35 U.S.C. 154(b) by 21 days.

(21) Appl. No.: 14/066,633

(22) Filed: Oct. 29, 2013

(65) Prior Publication Data

US 2015/0117787 A1     Apr. 30, 2015

(51) Int. Cl.
*G06K 9/48*     (2006.01)
*G06T 5/00*     (2006.01)
*H04N 5/64*     (2006.01)

(52) U.S. Cl.
CPC ..................................... *G06T 5/002* (2013.01)

(58) Field of Classification Search
CPC ................................. G06K 9/00; G06T 5/002
USPC ......... 382/199, 254, 276, 289, 290, 309, 310; 348/746, 806
See application file for complete search history.

(56) References Cited

U.S. PATENT DOCUMENTS

| 8,285,077 | B2 * | 10/2012 | Fero et al. ..................... 382/290 |
| 2006/0078215 | A1 | 4/2006 | Gallagher |
| 2012/0321216 | A1 | 12/2012 | Kacher et al. |
| 2013/0094764 | A1 | 4/2013 | Campbell |

OTHER PUBLICATIONS

Grammatikopoulos, Lazaros et al., "An Automatic Approach for Camera Calibration from Vanishing Points," ISPRS Journal of Photogrammetry & Remote Sensing, Apr. 12, 2007, pp. 64-76.
Harris, Chris et al., "A Combined Corner and Edge Detector," The Plessey Company, 1988, pp. 147-152.
Lee, Hyunjoon et al., "Automatic Upright Adjustment of Photographs," Proc. Computer Vision and Pattern Recognition (CVPR), 2012, pp. 877-884.
Hartley, Richard et al., Multiple View Geometry in Computer Vision, Cambridge University Press, 2000, pp. 27-37.
Marcos Nieto et al.; Real-time Robust Estimation of Vanishing Points Through Non-linear Optimization; Proceedings SPIE; vol. 7724, Jan. 1, 2010; Eight Pages.
Krishnendu Chaudhury et al. "Auto-Rectification of User Photos", Proc. of IEEE International Conference on Image Processing, ICIP 2014, Oct. 27-30, 2014; p. 5.
Andrea Matessi et al.; Vanishing Point Detection in the Hough Transform Space, LNCS; vol. 1685; Jan. 1, 1999; pp. 987-994.
Jana Kosecka et al; "Video Compass In: Lecture Notes in Computer Science" Jan. 1, 2002; Springer Berlin Heidelberg, Berlin Heidelberg ISSN 0302-9743; vol. 2353, pp. 476-490.

(Continued)

*Primary Examiner* — Abolfazl Tabatabai
(74) *Attorney, Agent, or Firm* — IP Spring

(57) ABSTRACT

Implementations relate to relate to rectification of distortion in an image. In some implementations, a method includes extracting edgelets from an image, each edgelet defined by a location of a pixel having an edge depicted in the image and defined by a direction of the edge. The method finds at least one vanishing point in the image based on intersections of pairs of the edges of the edgelets. Each vanishing point is selected based on a plurality of the edgelets in the image having edges approximately aligned with the vanishing point. Found vanishing points are used to transform the image to reduce image distortion.

20 Claims, 10 Drawing Sheets

(56) References Cited

OTHER PUBLICATIONS

Luigi Barazzetti; "Planar Metric Rectification Via parallelograms" Proceeds SPIE vol. 8085, Jan. 1, 2011; 12 pages.
D. Liebowitz et al.; "Metric Rectification for Perspective Images of Planes" Computer Vision and Pattern Recognition, 1998; Proceedings 1998 IEEE Computer Society Conference on Santa Barbara CA, pp. 482-488.
A.C. Gallagher; "Using Vanishing Points to Correct Camera Rotation in Images"; Computer and Robot Vision 2005; Proceedings the 2nd Canadian Conference on Victoria BC, Canada May 9-11, 2005; pp. 460-467.
C. Harris et al; "A Combined Corner and Edge Detector"; Alvey Vision Conference; Proceedings of the Alvey Vision Conference; Jan. 1, 1988; p. 147.
European Patent Office; International Search Report and Written Opinion PCT/US2014/062712; mailing date Feb. 4, 2015; 18 Pages.

* cited by examiner

AUTOMATIC RECTIFICATION OF DISTORTIONS IN IMAGES

BACKGROUND

The popularity and convenience of digital cameras as well as the widespread of use of Internet communications have caused digital images to become ubiquitous. For example, user-produced digital photographs are posted to various Internet sites, such as web pages, social networking services, etc. for users and others to view. However, many images, such as photographs taken by a camera, include various forms of image distortion. In some cases, such distortion can be caused involuntary rotations of a camera capturing the images. In one example, an image depicts a scene having parallel linear features but these features are shown in the image as distorted non-parallel features. Furthermore, features in the scene that should be horizontal or vertical in the image may be out of alignment in the captured image.

SUMMARY

Implementations of the present application relate to rectification of distortion in an image. In some implementations, a method includes receiving an input image and extracting a plurality of edgelets from an image, each edgelet defined by a location of a pixel having an edge depicted in the image and each edgelet defined by a direction of the edge. The method finds at least one vanishing point in the image based on intersections of pairs of the edges of the edgelets. Each vanishing point is selected based on a plurality of the edgelets in the image having edges approximately aligned with the vanishing point. Found vanishing points are used to transform the image to reduce image distortion.

Various implementations and examples of the method are described. For example, each edgelet can be associated with an edge line extending through the location in the direction of the edgelet, where finding the vanishing point can be based on intersections of edge lines and selecting the vanishing point based on edges having edge lines approximately aligned with the vanishing point. The direction of the edgelet can be a direction indicated by examining a neighborhood of pixels surrounding the pixel having the edge. Each edgelet also can be defined by a strength of the edge, where the strength is indicative of a magnitude of a discontinuity in pixel values between the pixel and at least one neighboring pixel. The strength of the edgelet can be based on a magnitude of an eigenvalue of a matrix based on the pixel and the direction of the edgelet can be based on an eigenvector corresponding to the eigenvalue. Extracting the edgelets can include using a corner detector to detect pixels having edges and pixels having corners, where each pixel having a detected edge is associated with a different edgelet and the pixels having corners are excluded from association with edgelets. Finding each vanishing point can be based on a weighted majority of the edgelets in the image having edge lines at least approximately aligned with the at least one vanishing point, and can also include checking sets of randomly-selected edgelets and candidate vanishing points formed by the sets of randomly-selected edgelets for the weighted majority of the aligned edge lines. In some implementations, finding each vanishing point can include randomly selecting a pair of the edgelets, finding a candidate vanishing point at the intersection of the edge lines of the selected pair of edgelets, determining a contribution to a score for the pair of edgelets from each of the other edgelets based on an alignment of the edge lines to the candidate vanishing point, repeating the random selection and contribution for other pairs of the edgelets and associated candidate vanishing points, and selecting the candidate vanishing point having the highest score. The contribution to the score for the pair of edgelets from each of the other edgelets can also be based on a strength of each other edgelet. Finding a vanishing point can also include re-estimating the found vanishing point more accurately using a weighted estimation of a best intersection point of edgelets that contributed to the score of the found vanishing point.

Transforming the image can include warping the image to cause parallel linear features in a scene captured in the image to become more parallel to each other as depicted in the image. The warping of the image can be performed using an affine rectification of the image using only two found vanishing points. The transformation of the image can include an alignment transformation using a rotation matrix to adjust an orientation of the image. For example, the alignment transformation can include aligning one of the found vanishing points with an axis of the image. The transformation of the image can include performing a transformation that is a product of an affine rectification and an alignment transformation. The method can further comprise performing at least one correctness check on the transformed image to determine whether the transformation of the image is to be discarded, where the correctness check is based on image size distortion, face distortion, and/or horizon distortion within the transformed image.

A method includes, in some implementations, detecting a plurality of edges in an image and finding two vanishing points in the image based on intersections of pairs of edges. The two vanishing points are selected based on a plurality of the edges approximately aligned with the two vanishing points. The method uses the two vanishing points and no additional vanishing points to transform the image to reduce distortion in the image, where the transformation includes an affine rectification to cause parallel linear features in a scene captured in the image to become more parallel to each other in the image, and an alignment transformation to align an orientation of one or more depicted image features with a horizontal or vertical axis of the image.

In various implementations of the above method, detecting the plurality of edges can include extracting a plurality of edgelets from an image. Each edgelet can be defined by a location of a pixel having an edge depicted in the image and defined by a direction. The direction of the edgelet can be a direction indicated by examining a neighborhood of pixels surrounding the pixel having the edge, and each edgelet can be associated with an edge line extending through the location in the direction of the edgelet.

In some implementations, a system can include a storage device and at least one processor accessing the storage device and operative to perform operations. The operations include extracting a plurality of edgelets from an image, each edgelet defined by a location of a pixel having an edge depicted in the image and each edgelet defined by a direction. Each edgelet is associated with an edge line extending through the location in the direction of the edgelet. At least one vanishing point is found in the image based on intersections of pairs of the edge lines of the edgelets, where each vanishing point is selected based on a plurality of the edgelets in the image having edge lines approximately aligned with the at least one vanishing point. Found vanishing points are used to transform the image to reduce image distortion.

Various implementations of the system can provide operations including finding each of the at least one vanishing point by randomly selecting a pair of the edgelets and finding a candidate vanishing point at the intersection of the edge lines of the selected pair of edgelets. A contribution to a score can be determined for the pair of edgelets from each of the other edgelets based on an alignment of the edge lines of the other edgelets to the candidate vanishing point. The randomly selecting and determining a contribution can be repeated for a plurality of other pairs of the edgelets and a vanishing point having the highest score is selected.

DETAILED DESCRIPTION

Figure 1:
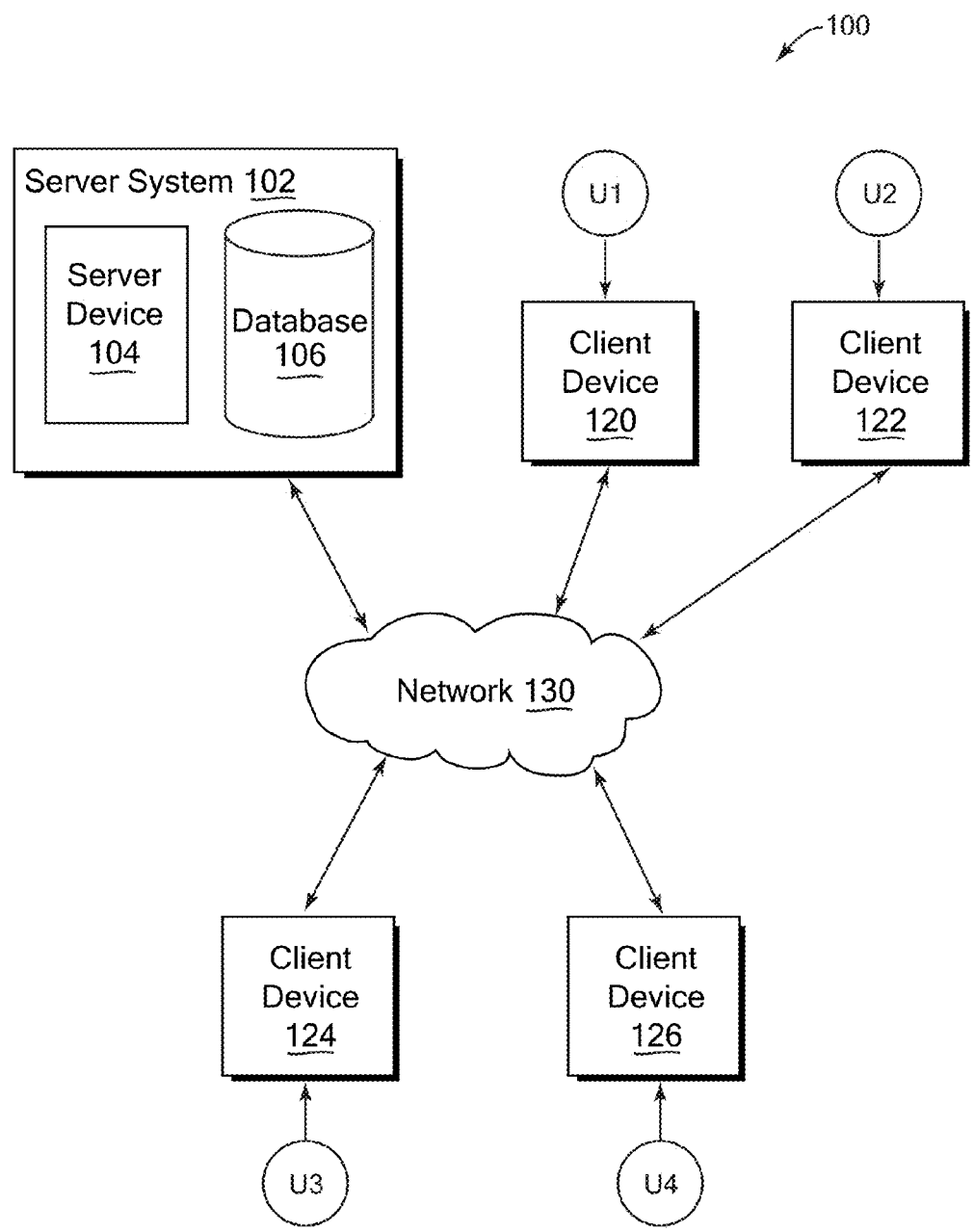
FIG. 1 is a block diagram of an example network environment which may be used for one or more implementations described herein.

One or more implementations described herein relate to rectification of distortion in images. In some implementations, a system extracts a plurality of edgelets from an image and finds at least one vanishing point in the image based on intersections of pairs of edges of the edgelets. A vanishing point is selected based on edgelets in the image having edges approximately aligned with that vanishing point. The system uses found vanishing points to transform the image to remove or reduce distortion from the image. For example, two vanishing points can be found and used to determine an affine rectification matrix and a rotation matrix to transform the image. These and other described features can allow efficient and robust rectification of perspective and angular distortion in images.

In example implementations, the system can receive an input image and extract edgelets from the image. Each edgelet is defined by a location of a pixel having an edge depicted in the image and defined by a direction of the edge, and can also be defined by a strength of the edge. Each edgelet can be associated with an edge line extending through the location in the direction of the edgelet. The system finds at least one vanishing point in the image based on intersections of pairs of the edge lines, where the vanishing point is selected based on a majority of the edgelets in the image having edge lines approximately aligned with that vanishing point. The system uses found vanishing points to transform the image to reduce distortion in the image. In some examples, an affine rectification is performed using two vanishing points to reduce perspective distortion in the image where non-parallel lines are made more parallel in the image, and an alignment transformation is performed to align the orientation of features of the image to the horizontal or vertical axis of the image. The system can also perform correctness checks can also be performed to discard transformed images that have new distortions introduced by the transformation.

Such features can allow effective reduction of distortion in images. For example, the system can accurately determine vanishing points in images for use in determining transforms for distortion removal or reduction. These vanishing points can be determined based on alignment of edgelets that each are defined by a pixel location and edge direction. Since the edgelets are defined at the pixel level, no straight line segments of multiple edge pixels need be determined or used to find vanishing points. Furthermore, features described herein allow distortions in images to be rectified by finding and using only two vanishing points, which can be much easier to determine within images such as user photographs than three vanishing points. Described features also can analyze transformed images to check for new distortions introduced by the rectification process, and discard transformed images that have caused particular image features to depart too much from the original image.

FIG. 1 illustrates a block diagram of an example network environment 100, which may be used in some implementations described herein. In some implementations, network environment 100 includes one or more server systems, such as server system 102 in the example of FIG. 1. Server system 102 can communicate with a network 130, for example. Server system 102 can include a server device 104 and a database 106 or other storage device. Network environment 100 also can include one or more client devices, such as client devices 120, 122, 124, and 126, which may communicate with each other via network 130 and/or server system 102. Network 130 can be any type of communication network, including one or more of the Internet, local area networks (LAN), wireless networks, switch or hub connections, etc.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In another example, database 106 and/or other storage devices can be provided in server system block(s) that are separate from server device 104 and can communicate with server device 104 and other server systems via network 130. Also, there may be any number of client devices. Each client device can be any type of electronic device, such as a computer system, portable device, cell phone, smart phone, tablet computer, television, TV set top box or entertainment device, display glasses, personal digital assistant (PDA), media player, game device, etc. In other implementations, network environment 100 may not have all of the components shown and/or may have other elements including other types of elements instead of, or in addition to, those described herein.

In various implementations, end-users U1, U2, U3, and U4 may communicate with the server system 102 and/or each other using respective client devices 120, 122, 124, and 126. In some examples, users U1-U4 may interact with each other via a social network service implemented on server system 102, where respective client devices 120, 122, 124, and 126 transmit communications and data to one or more server systems such as system 102, and the server system 102 provides appropriate data to the client devices such that each client device can receive content uploaded to the social network service via the server system 102. In some examples, the social network service can include any system allowing users to perform a variety of communications, form links and associations, upload and post shared content, and/or perform other socially-related functions. For example, the social network service can allow a user to send messages to particular or multiple other users, form social links in the form of associations to other users within the social network system, group other users in user lists, friends lists, or other user groups, post or send content including text, images, video sequences, audio sequences or recordings, or other types of content for access by designated sets of users of the social network service, send multimedia information and other information to other users of the social network service, participate in live video, audio, and/or text chat or teleconferencing with other users of the service, etc. As used herein, the term "social networking service" can include a software and/or hardware system that facilitates user interactions, and can include a service implemented on a network system.

A user interface can enable display of images and other content as well as communications, privacy settings, notifications, and other data on a client device 120, 122, 124, and 126. Such an interface can be displayed using software on the client device, such as application software or client software in communication with the server system. The interface can be displayed on an output device of a client device, such as a display screen.

Other implementations of features described herein can use any type of system and service. For example, any type of electronic device can make use of features described herein. Some implementations can provide these features on client or server systems disconnected from or intermittently connected to computer networks. In some examples, a client device having a display screen can display images and provide features and results as described herein that are viewable to a user.

Figure 2:
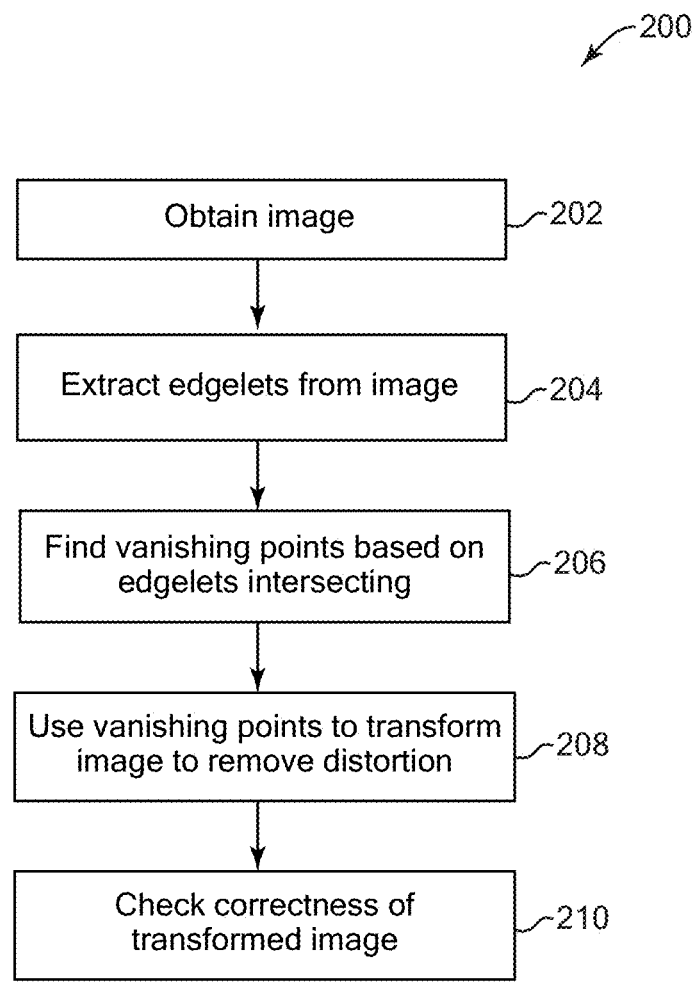
FIG. 2 is a flow diagram illustrating an example method for automatic rectification of distortion in an image, according to some implementations.

FIG. 2 is a flow diagram illustrating one example of a method 200 for automatic rectification of distortion in an image. In some implementations, method 200 can be performed, for example, on a server system 102 as shown in FIG. 1. In other implementations, some or all of the method 200 can be implemented on a system such as one or more client devices, and/or on both a server system and a client system. In described examples, the implementing system includes one or more processors or processing circuitry, and one or more storage devices such as a database 106 or other storage. In some implementations, different components of one or more servers and/or clients can perform different blocks or other parts of the method 200. Method 200 can be implemented by program instructions or code, which can be implemented by one or more processors, such as microprocessors or other processing circuitry and can be stored on a computer program product including a computer readable medium, such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, these methods can be implemented in hardware (logic gates, etc.), or in a combination of hardware and software. The method 200 can be performed as part of or component of an application running on the system, or as an application or software running in conjunction with other applications and operating system.

In some implementations, the method 200 can be initiated automatically by a system. For example, the method 200 can be periodically performed, or performed based on a particular event such as one or more original images being newly uploaded to or accessible by the system, or a condition specified in custom preferences of one or more users of the system. In one non-limiting example, a camera, cell phone, or other portable client device can capture one or more images and can perform the method 200. In addition or alternatively, a client device can send images to a server over a network, and the server can process the images using method 200. Some implementations can initiate method 200 based on user input. A user may, for example, have selected the initiation of the method 200 from an interface such as a social networking interface, application interface, or other interface.

In block 202 of method 200, the method obtains an image for processing, which can be referred to as the "original image" herein. The image can be a digital image composed of multiple pixels, for example, and can be stored on one or more storage devices of the system or otherwise accessible to the system, such as a connected storage device, e.g., a local storage device or storage device connected over a network. In various implementations, the image can be automatically selected by the method, e.g., as an image from an album or other collection of multiple images such as an album provided in an account of a user of a social networking system, as an image frame in a video stream of data, etc. In some implementations, the system can determine which image to obtain based on evaluating one or more characteristics of accessible images, such as the color distributions of images, timestamps and other metadata of images, and/or identified and recognized content depicted in the images, such as persons, faces, or objects. Alternatively, a user can provide or designate one or more images to process.

In block 204, the method extracts edgelets from the image. An "edgelet," as referred to herein, is an entity corresponding to an image point (e.g., pixel) and has a number of properties relating to an edge found in the image, which is a sufficiently-large discontinuity in pixel value such as color or brightness across pixels. For example, the edgelet properties can include edge location, edge direction, and edge strength. Edgelets can be extracted using any of a variety of techniques, including corner detection, edge detection, etc. Some example implementations of defining and extracting edgelets are described below with reference to FIG. 3.

In block 206, the method finds one or more vanishing points in the image using the edgelets. For example, the vanishing points can be found based on majorities of edgelets intersecting. In some implementations, a pair of edgelets are selected and their intersection point forms a candidate vanishing point. The candidate vanishing point is scored based on how closely aligned the other edgelets are to intersecting the candidate vanishing point, and the score can also be based on the strengths of the other edgelets. This scoring is performed for multiple candidate vanishing points, and the highest scoring candidate vanishing point is selected as a found vanishing point. Each found vanishing point can be re-estimated more accurately using contributing edgelets. Some example implementations of finding vanishing points are described below with reference to FIG. 4.

In block 208, the method uses the found vanishing points to transform the image to reduce distortion in the image. For example, the transformation can include warping the image to cause non-parallel linear features in the image which were parallel in the captured scene, to be made parallel or more parallel. A transformation or homography can be determined to perform the warping. For example, in some implementations, an affine rectification can be applied to the image. Furthermore, other transformations can also be included in block 208, such as an alignment transformation for adjusting the orientation of the image and aligning features with an image axis. Some example implementations of transforming the image are described below with reference to FIG. 5.

In block 210, the method checks the correctness of the transformed image to determine if the transformation of block 208 has introduced any new distortions. In some implementations, one or more features of the image can be examined to check for distortion. If too much distortion is found compared to the original image, then the transformation performed in block 208 is discarded and is not retained for the image. Some example implementations of correctness checks are described below with reference to FIG. 6.

Figure 3:
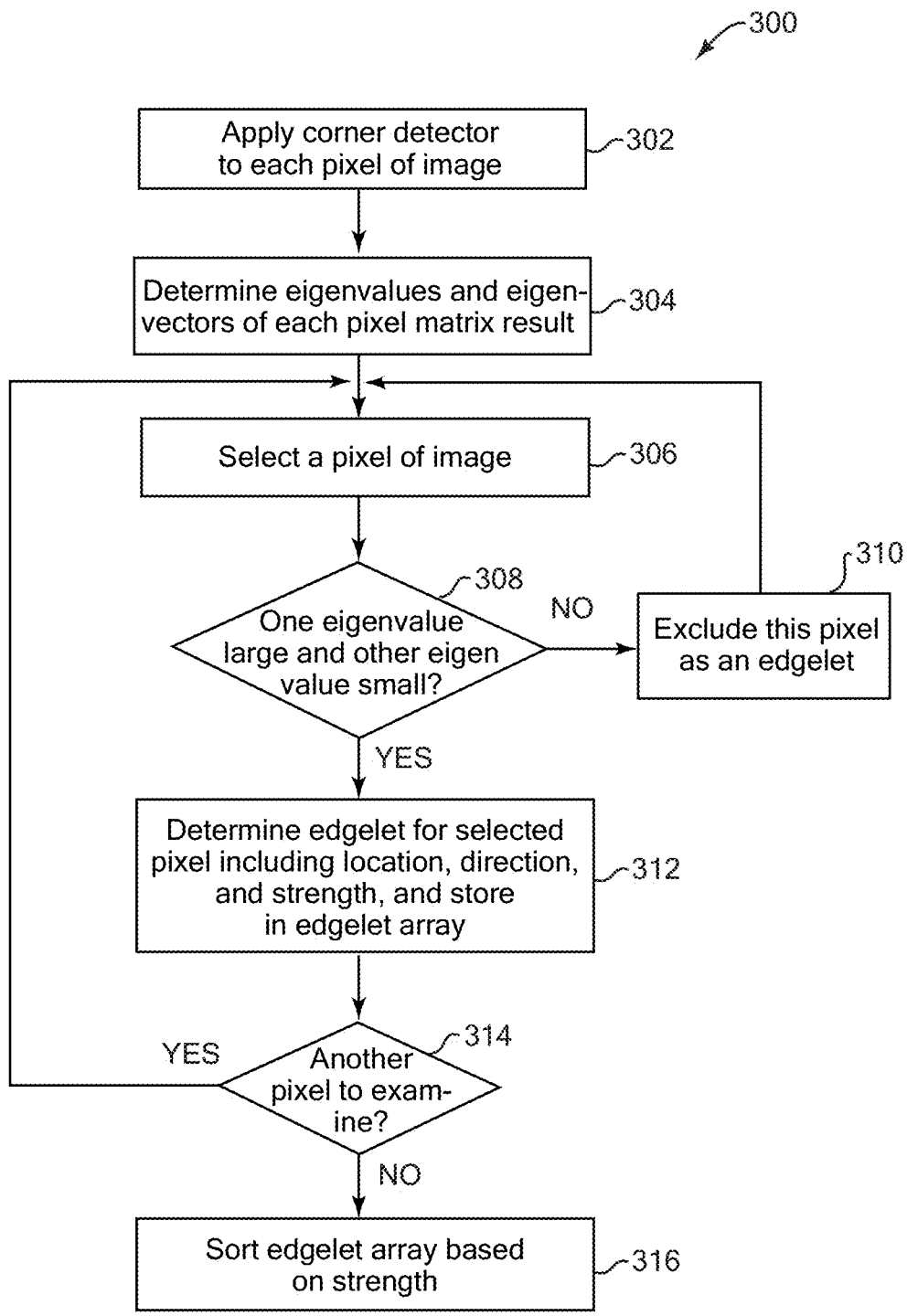
FIG. 3 is a flow diagram illustrating an example method for extracting edgelets from the image, according to some implementations.

FIG. 3 is a flow diagram illustrating an example method 300 implementing block 204 of FIG. 2, in which edgelets are extracted from the image. Method 300, for example, can be performed for block 204 of FIG. 2. In this example implementation, each edgelet is an edge point defined having multiple properties, which can include edge location, edge direction, and edge strength as described below. These properties of an edgelet relate to an edge depicted in the image, where an edge is a discontinuity of pixel values of a pixel relative to at least one neighboring pixel. For example, a large change in color or brightness from one pixel to an adjacent pixel can indicate an edge in the image.

In block 302, a corner detector is applied to the image. For example, in some implementations, a Harris corner detector type of operator is run over the image, which includes an edge detector (e.g. detects edges and corners in a single pass over the pixels). In one non-limiting example, specifically, at every image pixel, a result C is determined by computing a 2×2 matrix. This matrix can be as follows:

$$C = \begin{bmatrix} \sum_{\vec{x} \in N} I_x^2 & \sum_{\vec{x} \in N} I_x I_y \\ \sum_{\vec{x} \in N} I_x I_y & \sum_{\vec{x} \in N} I_y^2 \end{bmatrix}$$

where subscripts denote partial derivatives in x and y directions to find edges. In some implementations, a pixel window can be used to determine a derivative for each pixel in the window and the total of all the derivatives is averaged to reduce any effects of noise. In one non-limiting example, a 3×3 pixel window can be used to determine such an averaged derivative. In the subscripts of the matrix, $\vec{x}$ varies over N, where N is a rectangular neighborhood around the pixel, and where at each pixel in the neighborhood products of the averaged derivatives along x and y directions are determined, and then the results are summed. In one non-limiting example, a 5×5 pixel neighborhood around the pixel can be used.

In block 304, a pair of eigenvalues and eigenvectors of matrix C are determined for each pixel of the image as per Harris type detectors. In block 306, a pixel of the image is selected. In block 208, the method checks whether one eigenvalue is large and the other eigenvalue is small for the selected pixel. This block checks whether the selected pixel is an edge pixel. In some implementations, edgelets are extracted from only those points (pixels) where one eigenvalue is relatively large (e.g., compared to a predetermined threshold) and the other eigenvalue is relatively small (e.g., relative to the other eigenvalue or a threshold). Such pixels are pure edge points in the image. This block excludes pixels where both eigenvalues are small from being defined as edgelets, which are pixels in uniform pixel-value regions. Pixels that provide edge corners are also excluded, where both eigenvalues are large, because the edge direction is ambiguous at such corners (e.g., there can be two edges).

Thus, if the result of block 308 is negative, the selected pixel is excluded from being an edgelet. The method then returns to block 306 to select another pixel of the image. If the result of block 308 is positive, then in block 312, an edgelet corresponding to the selected pixel is defined. In this example, the location, direction, and strength of the edgelet are determined. For example, the location (e.g., x-y coordinates) of the selected pixel provides the location of the associated edgelet. The magnitude of the larger eigenvalue of the selected pixel provides the edge strength of the associated edgelet. The edge strength is indicative of the magnitude of the discontinuity in pixel value defining the edge. In addition, the eigenvector corresponding to the larger eigenvalue is chosen, and the direction orthogonal to this eigenvector provides the edge direction of the associated edgelet. This edge direction of the edgelet pixel is based on an edge found amongst the N rectangular neighborhood of pixels around the selected pixel. These properties thus determine the edgelet corresponding to the selected pixel. In some examples, an edgelet E can be represented as $$E = \{\text{location}: \vec{x}, \text{direction}: \vec{d}, \text{strength}: s\}$$

where $\vec{x}$ represents the homogenous coordinates for the edge pixel, $\vec{d}$ represents the edge direction in homogenous coordinates (derived from the principal eigenvector of C), and s is the edge strength (principal eigenvalue of C). An "edge line" associated with an edgelet E is an imagined line (or constructed line) passing through location $\vec{x}$ and parallel to direction $\vec{d}$ and can be used to determine intersection points of edges as described below (e.g., an edge line need not follow or correspond to a line of pixels in the image). The edgelet properties can be stored in an edgelet array.

Thus, an edgelet is an entity that represents a point at a particular pixel location, and that has a direction and strength based on its own pixel value and pixel values of neighboring pixels. The point-nature of an edgelet allows pixel-sized edges to contribute to determining vanishing points as described below.

In block 314, the method checks whether there is another pixel to examine in the image. If so, the method returns to block 306 to select another pixel in the image. If there are no more pixels to examine in the image, then in block 316, the edgelet array is sorted based on edgelet strength. Alternatively, the edgelet array can be sorted as each new edgelet is stored, e.g., in block 312.

In various other implementations, other detectors can be used instead of or in addition to a Harris-type of corner detector. For example other edge and/or corner detectors can be used that can provide a location and edge orientation or direction similarly as described above. Corner detectors are suitable since detected corners can be excluded as edgelets due to being ambiguous as to edge direction. In some other implementations, edgelets or edge entities similar to edgelets can be extracted and have fewer or more properties than those of the edgelets described above. Furthermore, in some implementations, edges can be detected in the image in ways other than extracting edgelets as described above. For example, any variety of known edge detection and/or corner detection techniques can be used. Such detected edges can include multiple adjacent linearly-arranged pixels forming line segments in some implementations, where only aligned pixels forming straight line segments can be retained while pixels in curved segments are discarded. Such straight multi-pixel line segments can have edges or edge lines that are checked for alignment and intersection with candidate vanishing points instead of checking edge lines of edgelets described above. Such line segments can be used in vanishing point determination similarly as described elsewhere herein.

Figure 4:
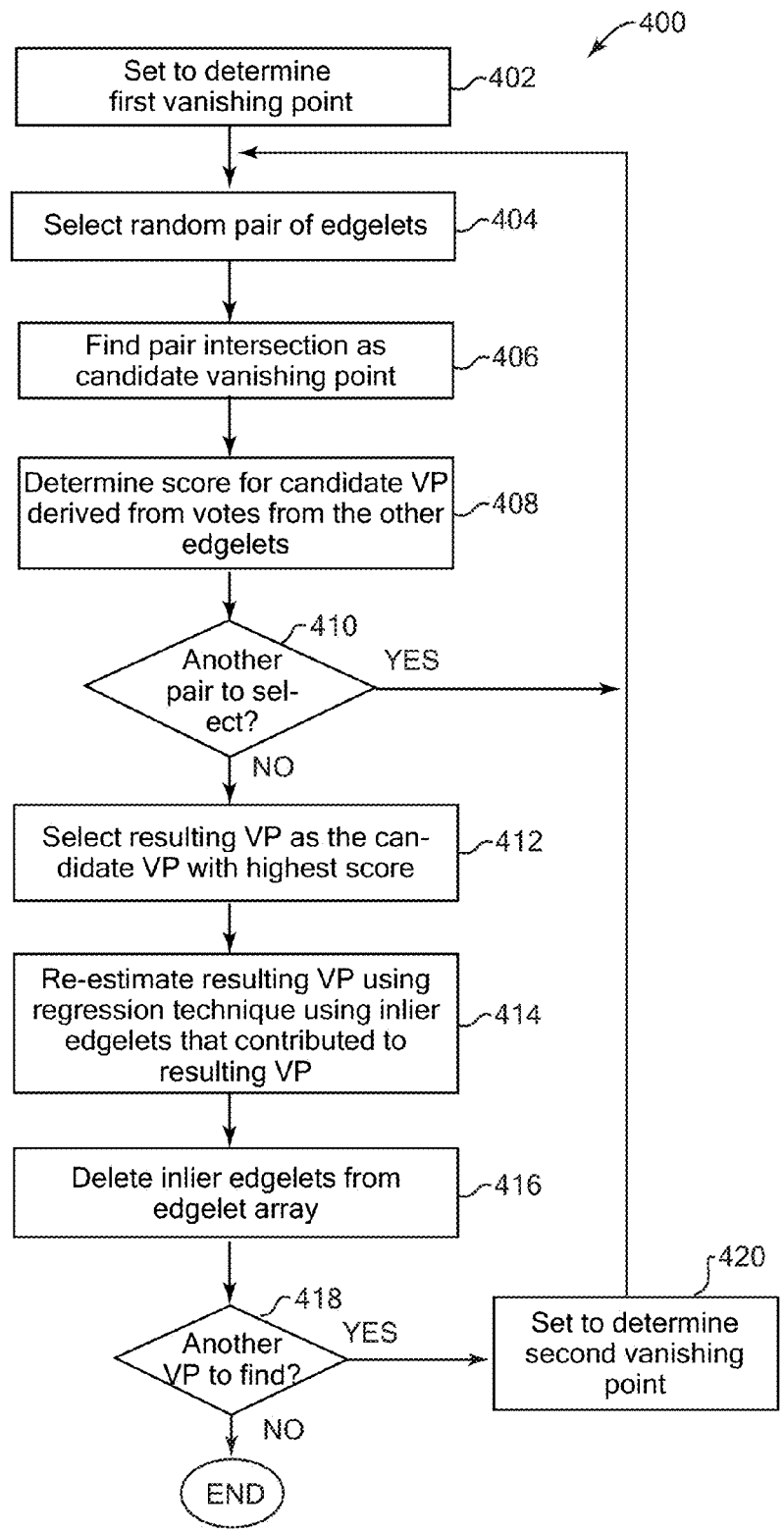
FIG. 4 is a flow diagram illustrating an example method for finding one or more vanishing points based on extracted edgelets, according to some implementations.

FIG. 4 is a flow diagram illustrating an example method 400 implementing block 206 of FIG. 2, in which one or more vanishing points are found based on the edgelets extracted in block 204. In this example implementation, two vanishing points are found. Furthermore, in this example a RANSAC (Random Sample Consensus) type of method is used in which a random model is hypothesized and a consensus for that model is determined by gathering votes for that model. The model with the most votes (e.g., score) wins as the selected result. Other methods can be used in other implementations.

In block 402, the method is set to determine a first vanishing point. In block 404, a random pair of the edgelets is selected from the stored array of edgelets. In some implementations, the selected pair of edgelets can be randomly picked from the entire array. In other implementations, the random selection can be biased so that it is not completely random. For example, one or both of the pair of edgelets can be selected from a subset of the array of the edgelets, such as a subset of the highest strength edgelets or a subset having the highest magnitudes of a different edgelet property. In various implementations, each of the pair of edgelets can be selected from the same subset, or from different subsets. For example, the first edgelet in the pair can be selected from the top 20 percentile of the edgelets in the array, and the second edgelet in the pair can be selected from the top 50 percentile of the edgelets in the array. Since (in one example) the array is sorted based on edgelet strength, these will be the largest strength edgelets.

In block 406, the method finds a candidate vanishing point as the point of intersection of the edges (e.g., based on associated edge lines) of the selected pair of edgelets. This candidate vanishing point is the hypothesis vanishing point corresponding to a model M(E1, E2), where E1 is the first selected (model) edgelet and E2 is the second selected (model) edgelet of the pair. This vanishing point is a unique point (even though in some cases it lies at infinity) except in degenerate cases, e.g., when the edge lines for the model edgelets coincide or the random selector picks the same edgelet twice as model edgelets. In some implementations, the method can check for such degeneracy and if the edgelet pair is found to be degenerate, that model pair is rejected and a different selection is made for the model pair in block 404.

In block 408, the method determines a score for the candidate vanishing point derived from votes or contributions from the other edgelets in the edgelet array. For example, the method can iterate over all the other edgelets in the array (or over a large subset of the other edgelets), where each other edgelet casts a vote for this candidate vanishing point based on predetermined criteria. In some implementations, a vote is based, at least in part, on the closeness of the other edgelet to intersecting the candidate vanishing point, e.g., the amount of alignment to the candidate vanishing point. For example, the closer that the edge line of the other edgelet is to intersecting the candidate vanishing point, the larger the vote value that is cast by that other edgelet. Furthermore, in some implementations the vote value can be based on the edge strength of each other edgelet, where a larger strength edgelet casts a larger vote.

Figure 7:
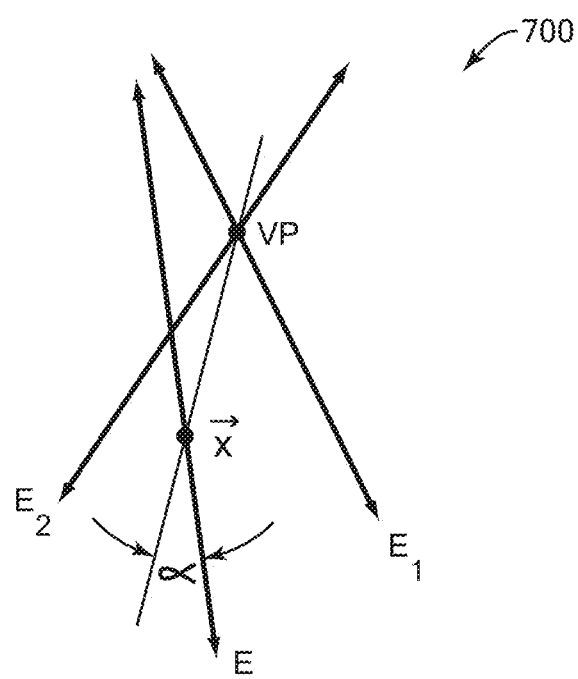
FIG. 7 is a diagrammatic illustration of an edgelet contributing to a candidate vanishing point as described in FIG. 4.

For example, in some implementations, the vote v(E, M) cast by another edgelet E to a model M(E1, E2) having intersecting edgelets E1 and E2 is given by:

$$v(E,M) = DC(E,M) \times s$$

where DC(E, M) is the direction coherence between edgelet E and the model M and s is the edge strength of E. The direction coherence is measured in terms of the alignment between the direction of the line joining $\vec{x}$ (which is the pixel location of the voting edgelet) and the candidate vanishing point of M, and the edgelet line corresponding to E, the voting edgelet. It is a decreasing function of the smaller angle α between the edgelet line of E and the line joining E's location to the candidate vanishing point. One example of this angle α is shown in FIG. 7. In an example implementation, a vote can range between 0 and 1, and the vote attains its maximum value of 1 when the edge line of the voting edgelet passes through the candidate vanishing point. The vote value drops to zero as the angle α reaches 90 degrees. In some implementations, the vote can be clipped to zero when this angle exceeds a threshold angle. In one non-limiting example, the threshold angle can be 5 degrees. For example, the direction coherence DC(E,M) can thus be expressed as follows:

$$DC(E, M) = \begin{cases} \dfrac{1 - e^{-\lambda_1 \cos^2 \theta}}{1 - e^{-\lambda_1}} & \text{if } \theta \leq 5° \\ 0 & \text{otherwise} \end{cases}$$

where $\lambda_1$ is a system parameter and θ is the shorter angle between edge line of edgelet E and the candidate vanishing point of M.

The vote contribution from each other edgelet is thus added to an overall vote total for the candidate vanishing point, which is considered the score for that candidate vanishing point.

In block 410, the method checks whether there is another pair of edgelets to select to find another candidate vanishing point and determine its score. If another pair is to be selected, then the method returns to block 404 to randomly select another pair of edgelets from the array, where one or both of the selected edgelets are different from previously-selected edgelets. In some implementations, the method can keep selecting a new pair of edgelets (e.g., one or both of the edgelets in the pair being different from previous iterations) at each iteration of block 404 until all pairs of available edgelets have been processed (e.g., all edgelets in the edgelet array or all edgelets within one or more subsets of the array as described above). In some implementations, a predetermined number of pairs can be selected in such iterations and then no further pairs are selected, e.g., as a way to reduce processing time. If no further pairs are to be selected, then the method continues to block 412.

In block 412, the method selects the resulting vanishing point (e.g., best model) as the candidate vanishing point having the highest score. Thus, the overall effect of this implementation is to find a vanishing point through which a majority of the edgelets' edge lines pass through, with some tolerance, such as tolerance in spatial intersection of edge lines with vanishing points and/or some variation based on edge strengths, for example.

The use of edgelets to accumulate voting contributions to finding vanishing points can be advantageous. For example, the point-nature of an edgelet allows edges associated with individual pixels to contribute to determining vanishing points, rather than having to find straight line segments consisting of multiple pixels to define edges as in some other techniques. For example, such other techniques find straight line segments by selecting only pixels within a straight line threshold of each other and discarding pixels outside this threshold that are not aligned. In contrast, the edgelet features described herein can allow pixels not on a straight line segment to still contribute a vote, if the direction of the corresponding edgelet's edge line is close enough to the vanishing point. Thus edgelet techniques need not make early decisions as to which pixels to exclude from contribution based on straight line thresholds, allowing for more accurate vanishing point determination. Furthermore, some other techniques explicitly check for a greater length of line segments of multiple pixels as a factor in contributing higher votes. Such length considerations need not be explicitly addressed using edgelet features described herein, since such a factor is implicitly considered by adding up each individual vote of each pixel-level edgelet that happens to be in a line segment and approximately intersects a candidate vanishing point.

In block 414, the method re-estimates a more accurate location of the resulting vanishing point by using a regression technique with the inlier edgelets that contributed to the resulting vanishing point. The regression technique can be any suitable estimation technique, such as a weighted least squares regression-based estimation, that determines a best fit from data points. The inlier edgelets used in the regression technique are those edgelets that contributed votes to the resulting vanishing point that are above a predetermined threshold value. For example, an edgelet $E_i$ can be considered an inlier edgelet if its vote for the resulting vanishing point was greater than zero.

In one example implementation using a weighted least squares regression-based estimation, N denotes the number of inliers of $M_{best}$, which is the best model, e.g., the best intersection point for the inlier edgelets. Furthermore, $S=\{E_i, i \in [1,N]\}$ is the set of inliers for $M_{best}$. $\vec{l}_i = [a_i\ b_i\ c_i]^T$ denotes the homogenous two-dimensional edgelet line for $\vec{v}_M = [x_M\ y_M\ z_M]^T$ denotes the (as yet undetermined) best fit vanishing point corresponding to M. If $\vec{l}_i$ passes through $\vec{v}_M$ then $\vec{l}_i \cdot \vec{v}_M = 0$, or:

$$[a_i\ b_i\ c_i]\begin{bmatrix} x_M \\ y_M \\ z_M \end{bmatrix}$$

Each inlier edgelet contributes one such equation. Consequently, the overdetermined homogeneous linear system to be solved for results as follows:

$$\begin{bmatrix} a_1 & b_1 & c_1 \\ a_2 & b_2 & c_2 \\ \vdots & \vdots & \vdots \\ a_N & b_N & c_N \end{bmatrix} \begin{bmatrix} x_M \\ y_M \\ z_M \end{bmatrix} = 0$$

Furthermore, each row is weighted by the value of the vote cast by the edgelet corresponding to that row. For example, strong voters pull the solution closer to themselves. The final system looks like:

$$\text{Diagonal}(v_1, v_2, \ldots v_N)\begin{bmatrix} a_1 & b_1 & c_1 \\ a_2 & b_2 & c_2 \\ \vdots & \vdots & \vdots \\ a_N & b_N & c_N \end{bmatrix} \begin{bmatrix} x_M \\ y_M \\ z_M \end{bmatrix} = 0$$

or more compactly, $A\vec{v}_M = 0$, to be solved for $\vec{v}_M = [x_M\ y_M\ z_M]$.

In some implementations, the homogeneous overdetermined system can be solved by the well-known Singular Value Decomposition method. Since the system is homogeneous (i.e., the right hand side of the above equation is 0), the smallest singular value of the matrix A will be 0 (within tolerance). If not, the system is inconsistent and the vanishing point is rejected. The eigenvector of $A^T A$ corresponding to the 0 singular value is the solution. This solution can be stored as the more-accurately estimated vanishing point. In the first iteration of method 400, this vanishing point is the first vanishing point to be found.

In block 416, the method removes the inlier edgelets from the edgelet array. These are the edgelets used in the estimation of the vanishing point in block 414. Since these edgelets should not be used to find another, different vanishing point, they are removed from consideration in any later iterations. In block 418, the method checks whether another vanishing point is to be found, e.g., a second vanishing point. If not, the method ends. If so, the method is set to determine another vanishing point in block 420 and the method returns to block 404 to estimate the new vanishing point.

In the descriptions and examples herein, homogenous notation is typically used to represent points and lines. This allows points at infinity to be treated as any other points and not as special cases. A homogenous two-dimensional (2D) point can be represented as the form $\vec{p} = [x\ y\ z]^T$. It corresponds to the 2D non-homogenous point $$\left[\frac{x}{z}\ \frac{y}{z}\right]^T, \forall x, y, z \in \mathbb{R}.$$

Thus a given homogenous point does not correspond to a unique non-homogenous point. Rather, it corresponds to a set of non-homogenous points. All these non-homogenous points lie on a ray joining the world origin to the 3D point $\vec{p}$. This ray is the conceptual analog of the homogenous point. For any specific $z=z0$, the corresponding non-homogenous point is the ray's intersection with the plane which is parallel to the world XY plane and at a distance z0 from the origin. In other words, the non-homogenous point is the image of the scene point $\vec{p}$ on the $z=z0$ plane. It should be noted that substituting $z=0$ in homogeneous coordinates yields points at infinity.

Similarly, the homogenous 2D representation of a line is the 3×1 vector $\vec{l} = [a\ b\ c]^T$. In non-homogenous math, the equation of a line is $ax+by+c=0$, which leads to $$a\frac{x}{z} + b\frac{y}{z} + c = 0,$$

or $ax+by+cz=0$, or $\vec{l} \cdot \vec{p} = 0$. Just as a 3D ray through origin is the conceptual analog of a homogenous 2D point, a 3D plane through origin with direction cosines corresponding to a, b, c is the conceptual analog of homogenous 2D line. Point line membership and intersection of lines then can accommodate points at infinity (z=0) without any special casing.

Figure 5:
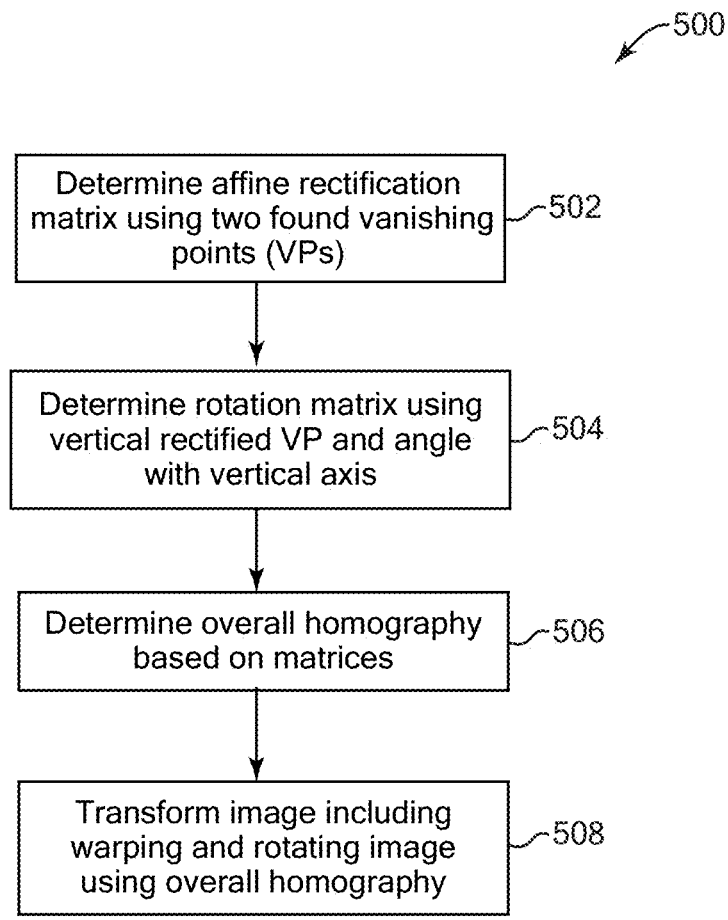
FIG. 5 is a flow diagram illustrating an example method for using vanishing points to transform an image to reduce distortion in that image, according to some implementations.

FIG. 5 is a flow diagram illustrating an example method 500 implementing block 208 of FIG. 2, in which the method uses vanishing points to transform an image to reduce distortion in that image. In the described example implementations, the transformation includes an affine rectification and an orientation alignment.

In block 502, the method uses the two vanishing points found in block 206 of FIG. 2 to determine an affine rectification matrix. The affine rectification matrix can be used to warp the image to make non-parallel lines in the image appear parallel (or more parallel than they appeared in the original image). These non-parallel lines were parallel in the scene captured in the image, and thus the warping reduces distortion of the original scene.

In the below examples, a line joining the two found vanishing points is determined, which allows the method to determine an affine rectification matrix H. This affine rectification matrix is able to transform (e.g., warp) the image so that these vanishing points are mapped out to infinity. The physical implication of this transformation is that parallel lines in the depicted scene become parallel (or more parallel) in the image, since parallel lines have a vanishing (intersection) point at infinity.

In an example implementation, the method involves projection onto an arbitrary plane, where the points at infinity are mapped to finite points on the plane. Such points are vanishing points for that plane; this is the reason parallel lines seem to meet in images. Correspondingly, the line at infinity also gets mapped to arbitrary lines on the image. In $\mathbb{P}^2$, the space of homogenous 2D points, the line at infinity stands for the line containing all the points at infinity, i.e., all points of the form $\vec{p}_\infty = [x\ y\ 0]^T$. Its homogenous representation is $\vec{l}_\infty = [0\ 0\ 1]^T$. It can be verified that $\vec{l}_\infty \cdot \vec{p}_\infty = 0, \forall x, y \in \mathbb{R}$, which proves that all points of infinity lie on the line at infinity.

To determine the affine rectification, let $\vec{v}_1$ and $\vec{v}_2$ be a pair of vanishing points in an image (in homogenous 2D coordinates). Then $\vec{l} = \vec{v}_1 \times \vec{v}_2 = [l_1\ l_2\ l_3]^T$ is the homogenous 2D line joining them. Then $$H = \begin{bmatrix} 1 & 0 & 0 \\ 0 & 1 & 0 \\ l_1 & l_2 & l_3 \end{bmatrix}$$

is the affine rectification matrix.

The affine rectification maps the vanishing points back to infinity. For the first vanishing point, consider the vector $H\vec{v}_1$, in particular its last element.

$$H\vec{v}_1 = \begin{bmatrix} \vdots \\ \vec{l} \cdot \vec{v}_1 = \vec{v}_1 \times \vec{v}_2 \cdot \vec{v}_1 = 0 \end{bmatrix}$$

which establishes that the vanishing point $\vec{v}_1$ gets mapped back to infinity by the affine rectification matrix. The second vanishing point $\vec{v}_2$ is similarly shown to be mapped to infinity using similar equations.

The affine rectification maps $\vec{l}$, the image of the line at infinity, back to $[0\ 0\ 1]^T$. The affine rectified version of $\vec{l}$ is $$H^{-T}\vec{l} = \begin{bmatrix} 1 & 0 & 0 \\ 0 & 1 & 0 \\ l_1 & l_2 & l_3 \end{bmatrix}^{-T} \begin{bmatrix} l_1 \\ l_2 \\ l_3 \end{bmatrix} = \begin{bmatrix} 0 \\ 0 \\ 1 \end{bmatrix}$$

which proves the proposition.

This affine rectification does not restore angles in the image to the angles depicted in the depicted scene. For example, angles between image linear features may not be equal to the corresponding scene angles. After the above affine rectification, the image differs from an ideal front-parallel view image by an affine homography only. However, for many photograph images there is typically not enough information to determine this affine homography. Metric rectification can restore such angles, but needs three vanishing points, which are difficult to obtain accurately for many or most types of photographs, and/or needs much more information about camera orientation than is obtainable in general cases (such as a corresponding orthogonal line pair between image and scene). Thus, in this implementation, the affine rectification restores parallelism, e.g., corrects perspective distortions to the extent that parallel lines in the scene become (more) parallel lines in the image, and an alignment transformation is performed to restore image angles in block 504, as described below.

In block 504, the method determines a rotation matrix for providing a vertical alignment of the image. The use of the rotation matrix allows correct angular orientation to be restored to the image by aligning lines that are intended to be vertical and/or horizontal in the image with the y-axis and/or x-axis of the image. In this example, the rotation matrix is operable to align the near vertical vanishing point with the image vertical (Y) axis. The rotation matrix is determined using a vertical vanishing point and its angle with the vertical axis of the image.

Let $\vec{v} = [v_x\ v_y\ 0]$ be the affine rectified vanishing point that has a direction closer to the vertical (Y) axis of the image, e.g., the vertical direction of the image borders of a rectangular image. Then, $$\theta = \cos^{-1} \frac{v_y}{\sqrt{v_x^2 + v_y^2}}$$

is the angle that the vanishing point makes with the vertical. Then the rotation matrix is $$R = \begin{bmatrix} \cos(\theta) & -\sin(\theta) & 0 \\ \sin(\theta) & \cos(\theta) & 0 \\ 0 & 0 & 1 \end{bmatrix}$$

The image can be transformed with this homography to adjust an orientation of the image, e.g., rotate the image and align (or approximately align) its content (e.g., one or more image features) with the horizontal and/or vertical axes of the image. For example, the horizontal and vertical axes can be parallel to the frame or borders of the image. Thus, the method can apply a 2D rotation to the above rectified affine image so that the vanishing point closer to vertical (in an angular sense) gets aligned with the image Y axis. An underlying assumption is that the involuntary camera rotation causing the alignment distortion is not large enough to switch the mode (landscape/portrait) of the image. In other implementations, the vanishing point having a direction closer to the horizontal (X) axis of the image can be used to determine a rotation matrix.

In block 506, the method determines an overall homography based on the affine rectification matrix of block 502 and the rotation matrix of block 504. For example, the overall homography T can be the product of the affine rectification homography H and the vertical alignment homography R, where T=RH.

In block 508, the method transforms, e.g., warps and rotates, the image using the overall homography determined in block 506. For example, the overall homography allows the method to perform a transformation that includes an affine rectification and the alignment transformation described above.

In some alternative implementations, the method can warp the image using the affine rectification matrix of block 502, and rotate the image using the rotation matrix of block 504 (in either order) as different transformation operations. However, since two transformations are made, such an implementation typically takes longer than transforming the image using the single overall homography described above.

Figure 6:
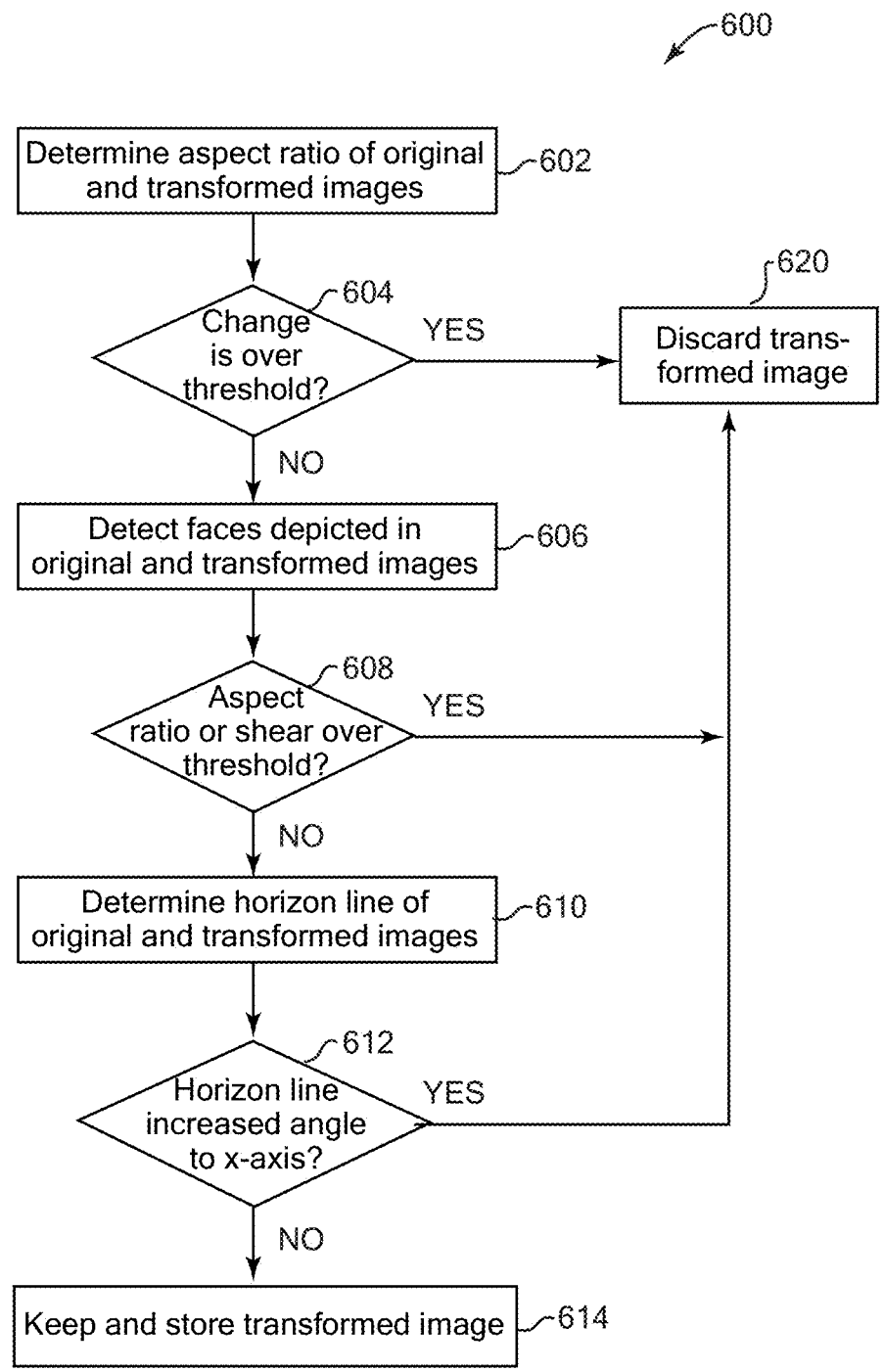
FIG. 6 is a flow diagram illustrating an example method for checking correctness of a transformed image, according to some implementations.

FIG. 6 is a flow diagram illustrating an example method 600 implementing block 210 of FIG. 2, in which the method checks correctness of the transformed image resulting from block 208 of FIG. 2. The method 600 can be used to determine whether the transformation succeeded in producing an image of higher quality, or whether the transformation introduced its own undesirable distortion. Some example correctness checks are described below in blocks 602-612.

In block 602, the method determines dimensions, such as the aspect ratio, of the original and transformed images. In block 604, the method checks the change in the dimensions and/or aspect ratio of the transformed image as compared to the original image obtained in block 202 of FIG. 2. A relatively large change in image aspect ratio can indicate an image size or dimension distortion that has occurred due to the transformation. If this change in dimensions and/or aspect ratio is over a predetermined threshold then the method continues to block 620, in which the transformed image is considered too distorted by the transformation and is discarded.

Otherwise, the method continues to block 606 and detects all faces depicted in the original image and transformed image. For example, the faces can be detected using any facial detection and/or facial recognition technique. In some implementations, the results of detecting faces in one of the images can assist in detecting images in the other image. In block 608, the method checks one or more characteristics of the detected faces and compares those characteristics to faces detected in the original image. In some implementations, the checked characteristics can include aspect ratio and shear of the detected faces. If the aspect ratio and/or shear of the faces in the transformed image has changed compared to the faces in the original image by a predetermined threshold or greater, then the method continues to block 620, in which the transformed image is considered to be distorted by the transformation and is discarded. Such face distortion checking can be important for many user photo images since even minor facial distortion can often be quickly noticed by viewers of the image.

Otherwise, the method continues to block 610, in which the method determines a horizon line of the original and transform images. For example, in some implementations the horizon line can be an approximately horizontal line (or multiple aligned line segments) extending approximately from the left side to the right side of the image, and having a overall minimum length over a threshold percentage of the image width. In block 612, the method compares the horizon line of the transform image with the horizon line of the original image. If the horizon line of the transformed image has increased its angle with the horizontal axis of the image as compared to that angle of the horizon line in the original image, then the method continues to block 620, in which the transformed image is considered to be distorted by the transformation and is discarded. Otherwise, the method continues to block 614, in which the transformed image is considered correctly transformed and is stored in available storage.

Various blocks and operations of the methods of FIGS. 2-6 can be performed in a different order than shown and/or at least partially simultaneously, where appropriate. In some implementations, operations can occur multiple times, in a different order, and/or at different times in the methods. Some blocks can be divided in their operations, with divided portions performed at different times and/or by different devices. In some implementations, the methods can be implemented, for example, on a server system 102 as shown in FIG. 1. In some implementations, one or more client devices can perform one or more blocks instead of or in addition to a server system performing those blocks.

Figure 8A:
FIGS. 8A and 8B are diagrammatic illustrations of example original and transformed images processed using features described herein.
Figure 8B:

FIGS. 8A-8B are diagrammatic illustrations of an example of an image processed according to one or more features of the implementations described above to provide a transformed image with reduced distortion. One or more of the images of FIGS. 8A-8B can be displayed on a display of a device in some implementations. In FIG. 8A, an original image 800 is shown. Image 800 shows perspective distortion in the non-parallel vertical sides and walls of the buildings depicted. For example, the vertical sides of the buildings lean inward towards a center of the image. In FIG. 8B, a transformed image 802 is shown resulting from the use of features described above to transform image 800. The vertical sides of the buildings are now shown to be parallel to the vertical axis of the image as originally depicted in the scene captured by the image.

Figure 9B:
FIGS. 9A and 9B are diagrammatic illustrations of another example original and transformed images processed using features described herein.
Figure 9A:
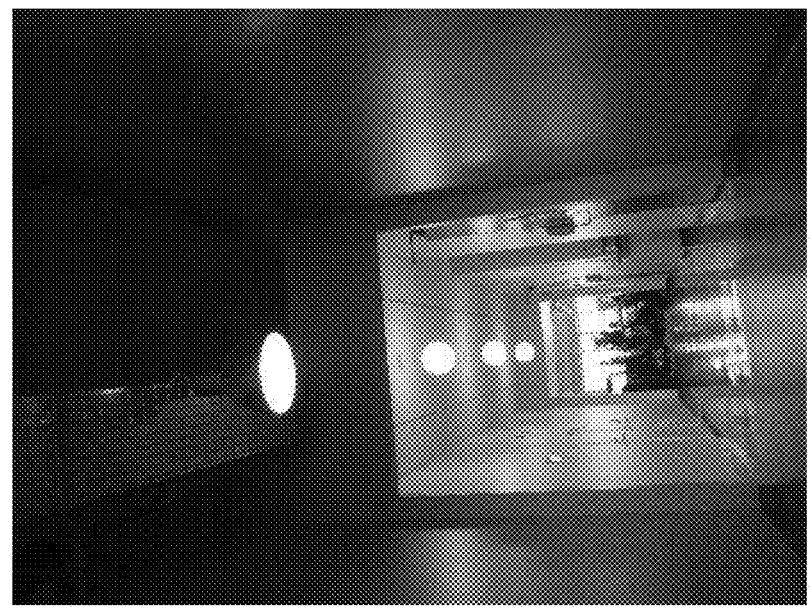

FIGS. 9A-9B are diagrammatic illustrations of an additional example of an image processed according to one or more features described above. One or more of the images of FIGS. 9A-9B can be displayed on a display of a device in some implementations. In FIG. 9A, an original image 900 is shown. This image suffers from perspective distortion, as shown by the vertical sides of the doorway which should be shown as parallel but are non-parallel and leaning towards the center of the image. This image also suffers from alignment distortion, where the entire scene is rotated counterclockwise. In FIG. 9B, a transformed image 902 is shown resulting from the use of features described above to transform image 900. The vertical sides of the doorway are now shown to be more parallel, and the depicted scene is more rotationally aligned with the vertical and horizontal axes of the image.

Figure 10:
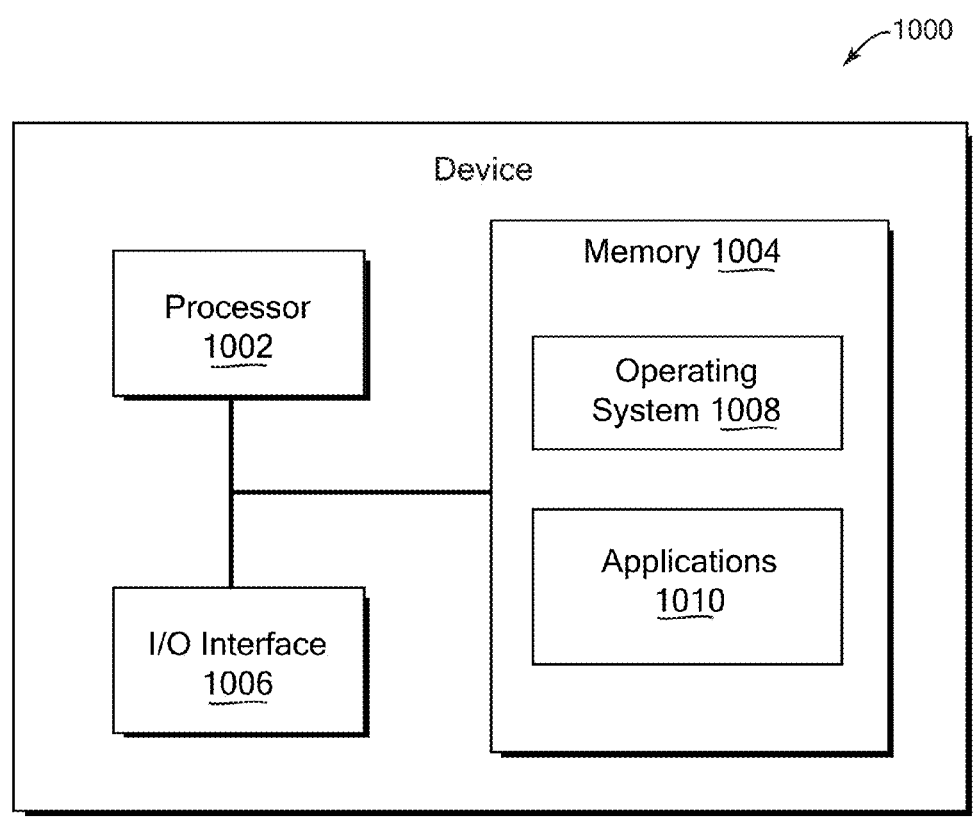
FIG. 10 is a block diagram of an example device which may be used for one or more implementations described herein.

FIG. 10 is a block diagram of an example device 1000 which may be used to implement some implementations described herein. In one example, device 1000 may be used to implement server device 104 of FIG. 1, and perform appropriate method implementations described herein. Server device 1000 can be any suitable computer system, server, or other electronic or hardware device. For example, the server device 1000 can be a mainframe computer, desktop computer, workstation, portable computer, or electronic device (portable device, cell phone, smart phone, tablet computer, television, TV set top box, personal digital assistant (PDA), media player, game device, etc.). In some implementations, server device 1000 includes a processor 1002, a memory 1004, and input/output (I/O) interface 1006.

Processor 1002 can be one or more processors or processing circuits to execute program code and control basic operations of the device 1000. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1004 is typically provided in device 1000 for access by the processor 1002, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 1002 and/or integrated therewith. Memory 1004 can store software operating on the server device 1000 by the processor 1002, including an operating system 1008 and one or more applications engines 1010 such as a graphics editing engine, web hosting engine, social networking engine, etc. In some implementations, the applications engines 1010 can include instructions that enable processor 1002 to perform the functions described herein, e.g., some or all of the methods of FIGS. 2-6. Any of software in memory 1004 can alternatively be stored on any other suitable storage location or computer-readable medium. In addition, memory 1004 (and/or other connected storage device(s)) can store images, arrays of edgelets, and other properties and data used in the features described herein. Memory 1004 and any other type of storage (magnetic disk, optical disk, magnetic tape, or other tangible media) can be considered "storage devices."

I/O interface 1006 can provide functions to enable interfacing the server device 1000 with other systems and devices. For example, network communication devices, storage devices such as memory and/or database 106, and input/output devices can communicate via interface 1006. In some implementations, the I/O interface can connect to interface devices such as input devices (keyboard, pointing device, touchscreen, microphone, camera, scanner, etc.) and output devices (display device, speaker devices, printer, motor, etc.).

For ease of illustration, FIG. 10 shows one block for each of processor 1002, memory 1004, I/O interface 1006, and software blocks 1008 and 1010. These blocks may represent one or more processors or processing circuitries, operating systems, memories, I/O interfaces, applications, and/or software modules. In other implementations, server device 1000 may not have all of the components shown and/or may have other elements including other types of elements instead of, or in addition to, those shown herein. While system 102 is described as performing steps as described in some implementations herein, any suitable component or combination of components of system 102 or similar system, or any suitable processor or processors associated with such a system, may perform the steps described.

A client device can also implement and/or be used with features described herein, such as client devices 120-126 shown in FIG. 1. Example client devices can include some similar components as the device 1000, such as processor(s) 1002, memory 1004, and I/O interface 1006. An operating system, software and applications suitable for the client device can be provided in memory and used by the processor, such as client group communication application software. The I/O interface for a client device can be connected to network communication devices, as well as to input and output devices such as a microphone for capturing sound, a camera for capturing images or video, audio speaker devices for outputting sound, a display device for outputting images or video, or other output devices. A display device, for example, can be used to display the settings, notifications, and permissions as described herein, where such device can include any suitable display device such as an LCD, LED, or plasma display screen, CRT, television, monitor, touchscreen, 3-D display screen, or other visual display device. Some implementations can provide an audio output device, such as voice output or synthesis that speaks text in ad/or describing the settings, notifications, and permissions.

Although the description has been described with respect to particular implementations thereof, these particular implementations are merely illustrative, and not restrictive. Concepts illustrated in the examples may be applied to other examples and implementations.

In situations in which the systems discussed here may collect personal information about users, or may make use of personal information, users may be provided with an opportunity to control whether programs or features collect user information (e.g., images depicting the user, information about a user's social network, user characteristics (age, gender, profession, etc.), social actions or activities, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected about the user and used by a server.

Note that the functional blocks, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or blocks shown as sequential in this specification may be performed at the same time.

What is claimed is:
1. A method comprising:
   extracting a plurality of edgelets from an image, each edgelet defined by a location of a pixel having an edge depicted in the image and each edgelet defined by a direction of the edge;
   finding at least one vanishing point in the image based on intersections of pairs of the edges of the edgelets, wherein the at least one vanishing point is selected based on a plurality of the edgelets in the image having edges approximately aligned with the at least one vanishing point; and using the at least one vanishing point to transform the image to reduce distortion in the image.

2. The method of claim 1 wherein each edgelet is associated with an edge line extending through the location in the direction of the edgelet, and wherein finding at least one vanishing point in the image is based on intersections of pairs of the edge lines of the edgelets, wherein the at least one vanishing point is selected based on a plurality of the edgelets in the image having edge lines approximately aligned with the at least one vanishing point.

3. The method of claim 2 wherein finding each of the at least one vanishing point is based on a weighted majority of the edgelets in the image having edge lines at least approximately aligned with the at least one vanishing point.

4. The method of claim 3 wherein finding each of the at least one vanishing point includes checking a plurality of sets of randomly-selected edgelets and candidate vanishing points formed by the sets of randomly-selected edgelets for the weighted majority of the aligned edge lines.

5. The method of claim 2 wherein finding each of the at least one vanishing point includes:
  randomly selecting a pair of the edgelets and finding a candidate vanishing point at the intersection of the edge lines of the selected pair of edgelets;
  determining a contribution to a score for the pair of edgelets from each of the other edgelets based on an alignment of the edge lines of the other edgelets to the candidate vanishing point;
  repeating the randomly selecting and determining a contribution for a plurality of other pairs of the edgelets and associated vanishing points; and
  selecting the candidate vanishing point having the highest score.

6. The method of claim 5 wherein each edgelet also is defined by a strength of the edge, wherein the strength is indicative of a magnitude of a discontinuity in pixel values between the pixel and at least one neighboring pixel, and
  wherein the contribution to the score for the pair of edgelets from each of the other edgelets is also based on a strength of each of the other edgelets.

7. The method of claim 5 wherein finding each of the at least one vanishing point includes re-estimating the found vanishing point more accurately using an estimation of a best intersection point of edgelets that contributed to the score of the found vanishing point.

8. The method of claim 1 wherein the direction of the edgelet is a direction indicated by examining a neighborhood of pixels surrounding the pixel having the edge.

9. The method of claim 1 wherein each edgelet also is defined by a strength of the edge, wherein the strength is indicative of a magnitude of a discontinuity in pixel values between the pixel and at least one neighboring pixel.

10. The method of claim 9 wherein the strength of the edgelet is based on a magnitude of an eigenvalue of a matrix based on the pixel and the direction of the edgelet is based on an eigenvector corresponding to the eigenvalue.

11. The method of claim 1 wherein extracting a plurality of edgelets includes using a corner detector to detect pixels having edges and pixels having corners, wherein each of the pixels having an edge is associated with a different edgelet and the pixels having corners are excluded from association with edgelets.

12. The method of claim 1 wherein transforming the image includes warping the image to cause parallel linear features in a scene captured in the image to become more parallel to each other as depicted in the image, wherein the warping of the image is performed using an affine rectification of the image using only two found vanishing points.

13. The method of claim 12 wherein the transformation of the image includes an alignment transformation using a rotation matrix to adjust an orientation of the image.

14. The method of claim 13 wherein the alignment transformation includes aligning one of the found vanishing points with an axis of the image.

15. The method of claim 1 wherein the transformation of the image includes performing a transformation that is a product of:
  an affine rectification to cause parallel linear features in a scene captured in the image to become more parallel to each other as depicted in the image; and
  an alignment transformation to align one or more depicted image features with a horizontal or vertical axis of the image.

16. The method of claim 1 further comprising performing at least one correctness check on the transformed image to determine whether the transformation of the image is to be discarded, wherein the correctness check is based on at least one of: image size distortion, face distortion, and horizon distortion within the transformed image.

17. A method comprising:
  detecting a plurality of edges in an image;
  finding two vanishing points in the image based on intersections of pairs of the edges, wherein the two vanishing points are selected based on a plurality of the edges approximately aligned with the two vanishing points; and
  using the two vanishing points and no additional vanishing points to transform the image to reduce distortion in the image, wherein the transformation includes:
    an affine rectification to cause parallel linear features in a scene captured in the image to become more parallel to each other as depicted in the image; and
    an alignment transformation to align an orientation of one or more depicted image features with a horizontal or vertical axis of the image.

18. The method of claim 17 wherein detecting the plurality of edges includes extracting a plurality of edgelets from an image, each edgelet defined by a location of a pixel having an edge depicted in the image and defined by a direction, wherein the direction of the edgelet is a direction indicated by examining a neighborhood of pixels surrounding the pixel having the edge, and wherein each edgelet is associated with an edge line extending through the location in the direction of the edgelet.

19. A system comprising:
  a storage device; and
  at least one processor accessing the storage device and operative to perform operations comprising:
    extracting a plurality of edgelets from an image, each edgelet defined by a location of a pixel having an edge depicted in the image and each edgelet defined by a direction, wherein each edgelet is associated with an edge line extending through the location in the direction of the edgelet;
    finding at least one vanishing point in the image based on intersections of pairs of the edge lines of the edgelets, wherein the at least one vanishing point is selected based on a plurality of the edgelets in the image having edge lines approximately aligned with the at least one vanishing point; and
    using the at least one vanishing point to transform the image to reduce distortion in the image.

20. The system of claim 19 wherein finding each of the at least one vanishing point includes:
- randomly selecting a pair of the edgelets and finding a candidate vanishing point at the intersection of the edge lines of the selected pair of edgelets;
- determining a contribution to a score for the pair of edgelets from each of the other edgelets based on an alignment of the edge lines of the other edgelets to the candidate vanishing point; and
- repeating the randomly selecting and determining a contribution for a plurality of other pairs of the edgelets and selecting a vanishing point having the highest score.

* * * * *